US008423576B2

(12) United States Patent
Drissi et al.

(10) Patent No.: US 8,423,576 B2
(45) Date of Patent: Apr. 16, 2013

(54) SYSTEM AND METHOD FOR QUERYING DATA STREAMS

(75) Inventors: Youssef Drissi, Ossining, NY (US); Barbara Ann Eckman, West Chester, PA (US); Tyrone Wilberforce Grandison, San Jose, CA (US); Colin George Harrison, Brookfield, CT (US); Perry G Hartswick, Millbrook, NY (US); Jurij R Paraszczak, Pleasantville, NY (US); Ralph Peter Williams, Danville, CA (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 12/685,048

(22) Filed: Jan. 11, 2010

(65) Prior Publication Data

US 2011/0173231 A1 Jul. 14, 2011

(51) Int. Cl.
*G06F 17/30* (2006.01)
(52) U.S. Cl.
USPC ............ 707/793; 707/803; 707/769; 707/770
(58) Field of Classification Search .................. 707/769, 707/770, 771
See application file for complete search history.

(56) References Cited

U.S. PATENT DOCUMENTS 6,560,590 B1 * 5/2003 Shwe et al. ..................... 706/55
7,630,961 B2 * 12/2009 Middelfart ............................ 1/1
7,720,867 B2 * 5/2010 Subramanian et al. ....... 707/793
2009/0228434 A1 * 9/2009 Krishnamurthy et al. ......... 707/2
2009/0228465 A1 * 9/2009 Krishnamurthy et al. ......... 707/4

OTHER PUBLICATIONS

Chung-Min Chen et al; "Stream Query Processing for Health Biosensor Applications"; Proceedings of the 20th International Conference on Data Engineering (ICDE); 2004; pp. 1-4.*
Neil Conway; "An Introduction To Data Stream Query Processing"; Truviso; May 24, 2007; pp. 1-45.*
Yunyao Li et al.; "Term Disambiguation in Natural Language Query for XML"; Springer-Verlag Berlin Heidelberg 2006; LNAI 4027, pp. 133-146, 2006.*

\* cited by examiner

*Primary Examiner* — Monica Pyo
(74) *Attorney, Agent, or Firm* — Harrington & Smith; Louis J. Percello (57) ABSTRACT

A method includes parsing input from a requestor, where the input includes at least one of a query and a command that is parsed into a structured query having an indication of at least one data stream or set of data streams and at least one action to be performed on the at least one data stream or set of data streams. The method further includes mapping the structured query into a graph of processing elements that are selected and interconnected so as to execute the structured query; instantiating the graph of processing elements and connecting and initializing the instantiated graph of processing elements with an identified at least one data stream or set of data streams to receive data there from; and outputting a result of the structured query to the requestor.

25 Claims, 3 Drawing Sheets

SYSTEM AND METHOD FOR QUERYING DATA STREAMS

TECHNICAL FIELD

The exemplary embodiments of this invention relate generally to information processing systems, methods and computer programs and, more specifically, relate to techniques for querying data.

BACKGROUND

The ability to formulate a query to obtain from a database some desired information is well known. One exemplary approach is the structured query language (SQL), which is a standard language for accessing and manipulating databases. SQL enables a user to execute queries against a database, retrieve data from a database, insert records into a database, update records in a database and delete records from a database. SQL can also be used to create new databases, new tables in an existing database, stored procedures in a database and views in a database.

However, not all data of interest is found stored in a database. For example, data of interest can be found in one or more dynamic streams of data, such as data generated by sensors and/or as a result of operation of a system or systems. Prior to this invention, the ability to effectively query one or more data streams to obtain data or information of interest has been limited or non-existent.

SUMMARY

The foregoing and other problems are overcome, and other advantages are realized, in accordance with the exemplary embodiments of this invention.

In one exemplary aspect thereof the invention provides a method that comprises parsing input from a requestor, where the input comprises at least one of a query or a command that is parsed into a structured query comprising an indication of at least one data stream or set of data streams and at least one action to be performed on the, at least one, data stream or set of data streams. The method further includes mapping the structured query into a graph of processing elements that are selected and interconnected so as to execute the structured query. The method further includes instantiating the graph of processing elements and connecting and initializing the instantiated graph of processing elements with an identified, at least one, data stream or set of data streams to receive data there from. The method further includes outputting a result of the structured query to the requestor.

Further aspects of this invention encompass a data processing system that comprises at least one data processor coupled with at least one memory that stores computer software, where execution of the computer software by the, at least one, data processor results in the system performing operations that implement the foregoing method.

Further aspects of this invention encompass a computer-readable medium that stores computer software, where execution of the computer software by at least one data processor results in operations that implement the foregoing method.

DETAILED DESCRIPTION

By way of introduction, a question that can be posed is that given some number of data streams (e.g., concerning resources in a city), how may one issue queries such as:

1. All energy metering streams from city block xyz, where the consumption has increased by more than 6% in the last 20 minutes, or
2. All city transit users who have traveled from station A to station B between 7:40 and 8:00 AM on Tuesday in the past three months?

The exemplary embodiments of this invention provide a system, method and computer program(s) configured to query data streams, and that provide an ability to locate longitudinal (within a given data stream) and correlation attributes (between two or more data streams) of time series data. Non-limiting examples include, but are not limited to, "average value over the past 24 hours", "standard deviation over the past 30 minutes", or "correlates of energy demand" and so forth, as opposed to point attributes such as "account balance", "instantaneous voltage", or "current demand".

Figure 1:
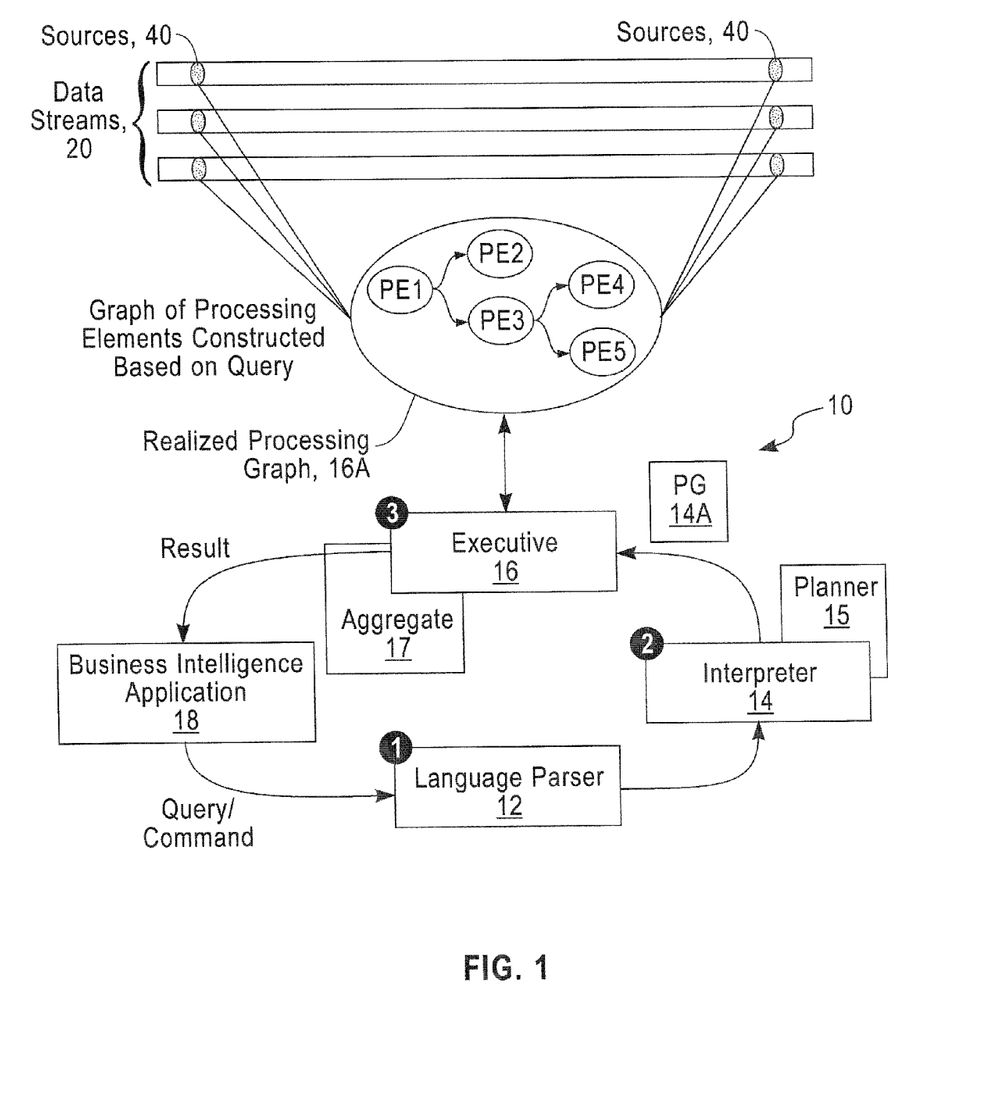
FIG. 1 shows a high level block diagram of a data stream query and control system that is suitable for implementing the exemplary embodiments of this invention.

Reference is made to FIG. 1 for showing a high level block diagram of a data stream query and control system 10 that is suitable for implementing the invention. The data stream query and control system 10 can be implemented with three modules or components, which can be software modules or components, hardware modules or components, or a combination of hardware and software modules or components. Briefly stated, these modules or components include a language parser 12, a compiler or interpreter 14 (referred to hereafter without a loss of generality simply as the interpreter 14) and an executive 16. The language parser 12 receives queries and command(s) submitted by a user or an application, e.g., a business intelligence application 18. The parser 12 verifies the input syntax and identifies parts of speech, e.g., nouns, verbs and modifiers. The parser 12 also builds a formal structure for use by the interpreter 14, and provides error and completion messages for the user/application 18. The interpreter 14 interprets input verbs in the context of the types of stream data to be processed and, in cooperation with a planner 15, selects an appropriate processing element (PE) and links intermediate stream processing results from the output of one processing element to the input of a next until a needed processing sequence is complete. The interpreter 14 also verifies the semantic structure of a resulting overall processing graph (PG) 14A and passes the processing graph 14A to the executive 16. The executive 16, based on the processing graph 14A, assembles the required processing elements (shown, for example, as PE1-PE5 in FIG. 1) and forms the interconnections between them, initializes the assembled and interconnected processing elements (which can be referred to as an 'instantiated processing graph' or as a 'realized processing graph' 16A), and connects the input(s) of the realized processing graph 16A to the source data stream(s) 20 and synchronizes the starting points across the various source data streams 20. The executive 16 also connects the output of the realized processing graph 16A to a destination sink and dispatches the assembly of processing elements of the realized processing graph 16A. The executive 16A also monitors the execution of the realized processing graph 16A for exceptions and reports to the user or application 18. An aggregation component 17 aggregates the analysis results into a final result that is passed to the user or application 18 that initially provided the query/command to the language parser 12. The aggregation component 17 can be the destination sink to which the output(s) of the realized processing graph 16A is connected.

It should be noted that exemplary embodiments of this invention encompass the use of a destination sink comprised of a storage medium and a file system that can capture and store an output stream from a realized processing graph 16A.

Note in FIG. 1 that an aspect of the executive 16 connecting the input(s) of the realized processing graph 16A to the data stream(s) 20 can be instantiating at least one source 40. A particular source 40 can be a processing element, such as one that monitors a flowing data stream for an occurrence of a certain keyword or keywords. For example, and referring to the second example below, one source 40 can be one that responds to an occurrence of a data field designated as "station_name='A'" in the data stream, while another source 40 can be one that responds to an occurrence of a data field designated as "travel_date" in the data stream. Note that a given source 40 can be responsive to more than one type of data, e.g., it can be capable of recognizing and capturing data associated with a plurality of different types of stream data. Note also that a particular source 40 can represent some component that generates data that comprises all or a part of a particular stream 20. Non-limiting examples of such source components include sensors, such as energy consumption monitors, temperature measuring devices, flow meters and devices that sense a passage of vehicles past some particular point. In this case the sensor(s) can be a part of an infrastructure (e.g., an urban center) that is being monitored by a user or application with queries based on a Structured Stream Query Language and Structured Stream Control Language as described below. Note also that some or all of the data of a particular data stream 20 can be video and/or audio data, and in this case the source 40 can be a video camera. Also in this case one or more of the instantiated processing elements of the realized processing graph 16A may include image and/or audio recognition capability. In general, a source 40 may be any hardware and/or software component that is capable of generating (or recognizing) data of interest.

In order to express the queries that can be processed by the data stream query and control system 10 there is provided a language that can be referred to for convenience as a "Structured Stream Query Language" or SSQL. The syntax for the Structured Stream Query Language can be somewhat similar to the SQL (Structured Query Language) used for databases. There are certain mappings or analogies that can be established between data elements used in SQL and those used in the Structured Stream Query Language, as depicted in the non-limiting examples shown in the Table of FIG. 2.

Figure 2:
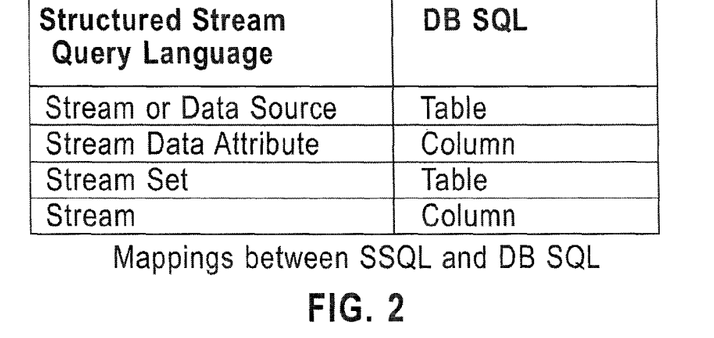
FIG. 2 is a Table depicting some exemplary mappings between a Structured Stream Query Language, in accordance with this invention, and DB SQL.

Each data element (e.g. Stream, Stream Set, Stream Data Attribute) is manipulated as if it were an object or a class in an object-oriented environment. Thus, a data stream is definable with a number of attributes and functions. Each attribute has a type, such as a primitive type (e.g., integer (int), string, array) or a class (e.g., tree, list). Certain global variables such as "ALL_STREAMS" are predefined in the language, and others (e.g., STATION_STREAM, as in the second example immediately below) can be defined by the user.

Several examples are now provided to illustrate the foregoing points by contrasting queries expressed in natural language and in the Structured Stream Query Language.

EXAMPLE 1

Query in Natural Language:
"List all the energy metering streams from city block xyz where the consumption has increased by more than 6% in the last 20 minutes"

Query in Structured Stream Query Language:
Q = SELECT * FROM ALL_STREAMS as S
    WHERE 'S.stream.consumption.increase(Now - 20min, Now) > 6%'

EXAMPLE 2

Query in Natural Language:
"List all the city transit users who have traveled from station A to station B between 7:40 and 8:00 am on Tuesday in the last three months"

Query in Structured Stream Query Language:
Q = Q1 Q2 (intersection of the results from the Q1 and Q2 queries)
Q1 = SELECT User_id FROM STATION_STREAM
    WHERE station_name = 'A'
    AND record_type = 'departure'
    AND travel_date ~ 'Tuesday,
    AND travel_date > Now - 3months
    AND travel_time < 8:00 am
    AND travel_time > 7:40 am
Q2 = SELECT User_id FROM STATION_STREAM
    WHERE station_name = 'B'
    AND record_type = 'arrival'
    AND travel_date ~ 'Tuesday,
    AND travel_date > Now - 3months
    AND travel_time < 8:00 am
    AND travel_time > 7:40 am In the foregoing examples the natural language query can be one actually entered into the language parser 12 by, for example, a user, and the query in the Structured Stream Query Language can be the corresponding output of the parser 12 that is input to the interpreter 14. For embodiments of this invention, where at least one stream of point-to-point information is being queried, this invention eliminates the unnecessary cost of converting the stream into a conventional data store, where the stream may be captured into a "bag of bytes", such as a data structure, that serves no other purpose. For embodiments where the query refers to a search within the search window that extends forwards and backwards along the stream (to possibly find correlated end point events), conventional systems are not able to accommodate this type of query.

A Structured Stream Control Language extends the Structured Stream Query Language with operations for controlling and manipulating data streams. The following structured stream control operations can be included (as non-limiting examples): "merge", "split", "combine", "delete", "encrypt", "route to", "duplicate", "replicate signal", "strengthen signal", "replace with", and "embed".

Several examples are now provided to illustrate the use of the Structured Stream Control Language.

EXAMPLE 1

Command in Natural Language:
"Split the data stream coming from station A into 3 streams. The first stream should contain only data related to energy consumption. The second stream should contain only data that is related to water consumption. The third stream should contain the remaining data."
Command in Structured Stream Control Language:
    Command = SPLIT STATION_STREAM AS S INTO s1,s2,s3
        WHERE station_name = 'A'
        AND s1.attributes.domain = "energy"
        AND s2.attributes.domain = "water"
        AND s3.attributes.domain NOT ("energy" OR "water")

EXAMPLE 2

Command in Natural Language:
    "Encrypt the data stream coming from station A to the maximum encryption strength"
Command in Structured Stream Control Language:
    Command = ENCRYPT STATION_STREAM TO MAX
        WHERE station_name = 'A'

Based on the foregoing it should be appreciated that the exemplary embodiments of this invention provide the data stream query and control system 10 having the query parser 12, the interpreter 14 that includes the planner 15, and the executive 16 that includes the aggregation component or unit 17, all of which were briefly discussed above with respect to FIG. 1.

The query/command parser 12 component receives the queries and commands submitted by a user or the application 18 and parses the input queries and commands into a structured query that comprises (and is not limited to) the following components: an action verb (e.g., select, encrypt, merge, split), one or more stream identifiers and/or one or more sets of stream identifiers and one or more attributes of each of the streams. Each stream identifier identifies a stream of data. Each of the streams of data can be assumed to be a flow, such as a continuous flow, of structured or unstructured data that changes with time.

The interpreter 14 component interprets the input verbs in the context of the types of stream data to be processed, and converts them into high-level results goals. The interpreter 14 component also selects the appropriate processing elements and data streams and invokes the automated planner 15 with the results goals as input to construct the graph 14A of processing elements that link the intermediate stream processing results from the output of one processing element to the input of a next processing element until the processing flow is complete. The interpreter 14 component also verifies the semantic structure of the overall processing graph 14A and passes the processing graph 14A to the executive 16.

The above-mentioned planner component 15 takes high-level analysis goals from the interpreter 14 and produces the processing graph 14A describing the execution flow of one or more of the processing elements. Each of the processing elements analyses one or more of the selected streams to produce one or more analysis results. Each of the processing elements can be comprised of one or more software modules or components, hardware modules or components, or a combination of hardware and software modules or components.

The executive component 16 analyzes the processing graph 14A and assembles (and instantiates if needed) the required processing elements and creates the required interconnections between them to produce the realized processing graph 16A. The executive component 16 then initializes the realized processing graph 16A, connects the input of the realized processing graph 16A to the specified source data streams 20 and synchronizes the starting points across the various streams. The output of the realized processing graph 16A is also connected to the destination sink. The executive component 16 then dispatches the processing elements of the realized processing graph 16A and. monitors the execution of the realized processing graph 16A for the occurrence of exception conditions. The aggregation component 17 aggregates the analysis results into a final result that is passed to the user or application 18 that initially provided the query/command to the language parser 12.

In operation, the query parser 12 receives the queries for the identification of one or multiple data streams or a set of streams from among one or more sets of such streams such that the returned selected collection of streams correspond to characteristics given in the query. The query characteristics can include, but are not limited to: longitudinal characteristics of individual streams, e.g., "streams that show an individual fluctuation in some attribute that is in the range 10-12%"; longitudinal characteristics of a sub-set of streams within one or more of the accessible sets, e.g., "streams that show an aggregate fluctuation in some attribute that is in the range 1-12%"; transverse characteristics of individual streams, e.g., "streams that show an individual fluctuation that in some attribute that is greater than 1.3 standard deviations of the average fluctuation of this attribute across some or all accessible sets"; auto-correlations of some attribute of individual or sets of streams that are indicators of repeated patterns of behavior or usage; correlations between individual or sets of streams of different types, e.g., "correlations between some attribute(s) of actual weather events with traffic congestion"; and longitudinal and correlation attributes of time series data across one or more streams or sets of streams.

The graph of processing elements, i.e., the realized graph of processing elements 16A, can be fed a combination of one or more of data streams of the following types: "today" or "current" streams that are selected real-time (or substantially real-time) streams of data from different sensors and/or other data sources 40; "yesterday" or "recorded" streams that are selected historical data streams (non-real time streams that are stored or archived); and "tomorrow" or "predicted" streams, that are output from forecasting models and simulators (e.g., a weather, economic or demographic forecasts or predictions).

Note with respect to a real-time data stream that the data conveyed can be of a type that would not normally be stored or archived, and thus would not exist for a subsequent analysis.

Note also that in all cases the input query can be a natural language query that is transformed by the parser 12 into the Structured Stream Query Language or Structured Stream Command Language equivalent of a structured query.

One benefit that is realized by the use of the exemplary embodiments of this invention is that an identifier of one or plural data streams can be returned as a final result, such that an originator of the query (e.g., the user or application 18) can connect to this stream or streams to perform further processing and/or create any desired type of visualization of the underlying data.

Figure 3:
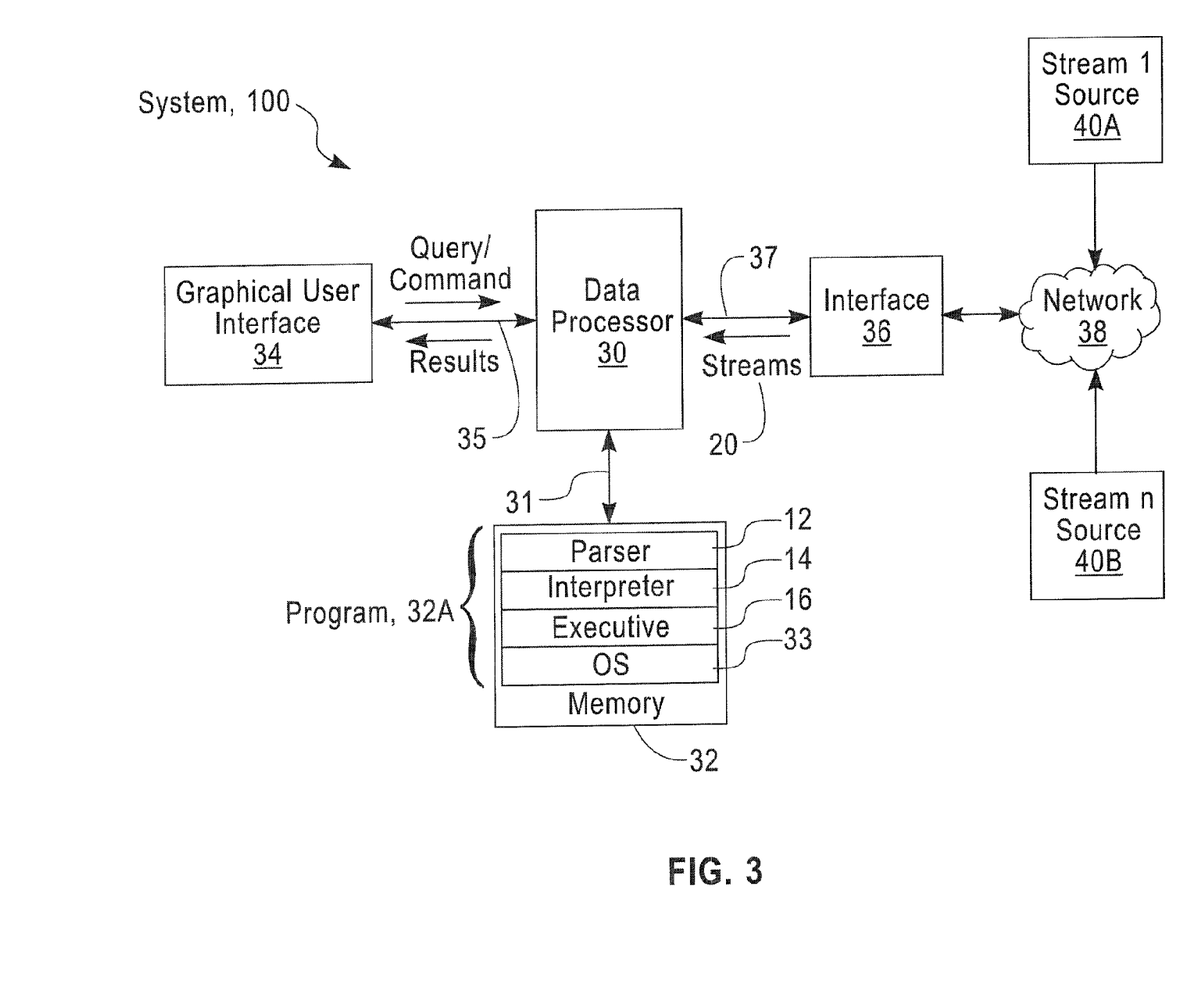
FIG. 3 is a simplified block diagram of a data processing system that is suitable for implementing the exemplary embodiments of this invention.

Reference is made to FIG. 3 for showing a simplified block diagram of a data processing system 100 that is suitable for use in implementing the exemplary embodiments of the data stream query and control system 10. The data processing system 100 includes at least one central processing unit (CPU) that can be embodied as at least one data processor 30 coupled to a bus 31 through which the data processor 30 can address a computer-readable medium, such as a memory sub-system that is also referred to herein simply as the memory 32. The memory 32 can include, as examples, RAM, ROM and fixed and removable disks and/or tape. The memory 32 is assumed to store a program (PROG) 32A that contains program instructions for causing the data processor 30 to execute methods in accordance with the exemplary embodiments of this invention. The program 32A can include a first program that implements the language parser 12, a second program that implements the interpreter 14, and a third program that implements the executive 16. Other programs, such as an operating system (OS) 33 are typically also stored in the memory 32.

The data processor 30 is also coupled through the same bus 31 or a different bus 35 to a user interface such as a graphical user interface (GUI) 34 that includes a user input device, such as one or more of a keyboard, a mouse, a trackball and/or a voice recognition interface, as well as a user display device, such as a high resolution graphical CRT display terminal, an LCD or plasma display terminal, or any suitable display device. The user interface 34 is employed by a user to interact with the program 32A during the execution of the methods in accordance with this invention. The natural language queries/commands can be entered by the user via the GUI 34, and the results of query processing can be visualized to the user via the GUI 34.

The data processor 30 can also be coupled through the bus 31 or a different bus 37 to a network interface 36 that provides bidirectional access to a data communications network 38, such as an intranet and/or the internet. Coupled to the network 38 can be one or more sources and/or repositories of (remote) data 40A, 40B that provide the data streams 20 (e.g., stream_1, stream_2, ..., stream_n.

Note that in some embodiments there can be a different data processor that executes each of the language parser 12, the interpreter 14 and the executive 16 functions, and these different data processors can be co-located or they can be geographically separate from one another and communicate with one another in a distributed processing manner via the network 38.

It can be noted that the exemplary embodiments of this invention encompass the use of at least three types of sources 40: real sensor streams, computer streams, such as the sinks of some antecedent realized processing graph, and the re-streaming of historical data. These types of sources 40 may preferably be logically indistinguishable in the programming model, and may be transparently accessible as the time window changes.

The exemplary embodiments of this invention also encompass the use of interleaved streams, such as two or more streams that are interleaved from the same source 40. The Structured Stream Control Language facilitates the interleaving of two or more streams (e.g., using merge and/or combine operations).

Note as well that it should be understood that a search "window" may extend both forward and backward along a given stream or streams. As such, there may be implicit request to search a sequential stream both forward and backward to locate correlated end point events.

Note as well that in an embodiment where the query/command is received from an application (a software application), instead of being received over the bus 35 the query/command can be received over the bus 31 from an application executing from the memory 32, or it can be received over the bus 37 from some remote application (or some remote user) connected through the network 38. In this latter case it should be appreciated that the system 100 can provide a data stream query fulfillment service to remote applications and/or users.

Figure 4:
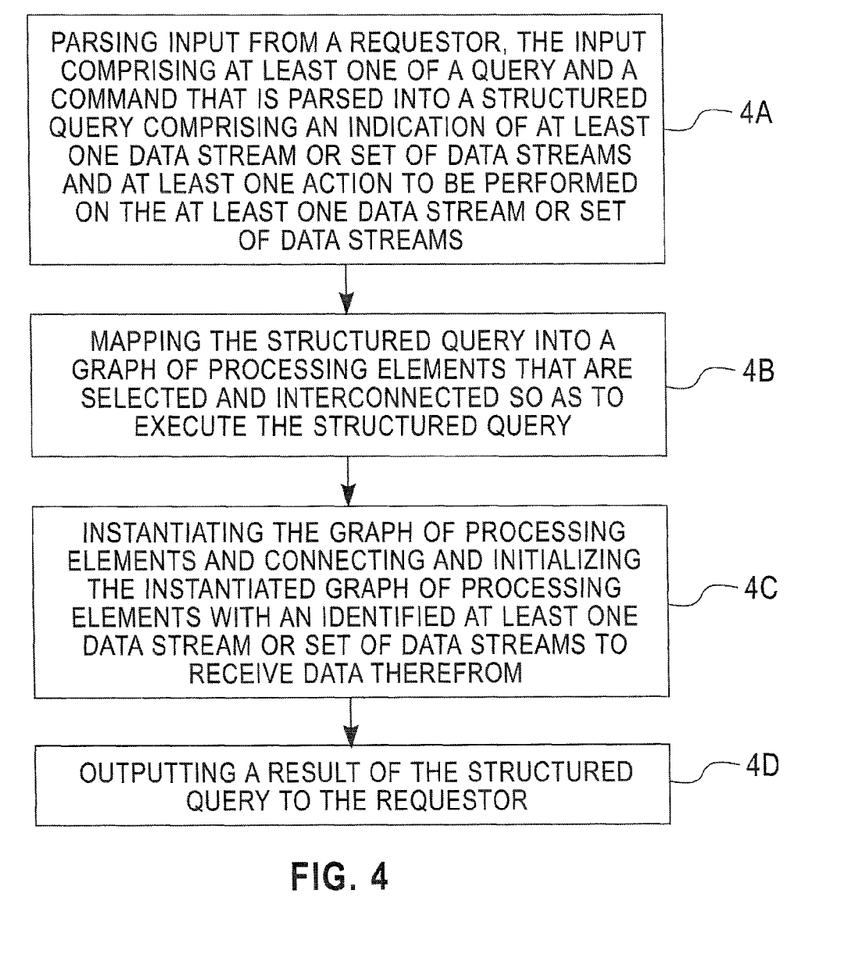
FIG. 4 is a logic flow diagram that is descriptive of a method, and the execution of computer software by one or more data processors, in accordance with the exemplary embodiments of this invention.

FIG. 4 shows a logic flow diagram of a method, and a result of the execution of the computer software, in accordance with the exemplary embodiments of this invention. At Block 4A there is a step of parsing input from a requestor, the input comprising at least one of a query or a command that is parsed into a structured query comprising an indication of at least one data stream or set of data streams and at least one action to be performed on the at least one data stream or set of data streams. At Block 4B there is a step of mapping the structured query into a graph of processing elements that are selected and interconnected so as to execute the structured query. At Block 4C there is a step of instantiating the graph of processing elements and connecting and initializing the instantiated graph of processing elements with an identified at least one data stream or set of data streams to receive data there from. At Block 4D there is a step of outputting a result of the structured query to the requestor.

In general, the embodiments of this invention can be implemented using one or more software programs running on a personal computer, a server, a microcomputer, a mainframe computer, a portable computer, an embedded computer, or by any suitable type of programmable data processor 30.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium may include a propagated data signal with computer readable data code embodied therein, for example, in baseband or as part of a carrier wave. Such a propagated signal may take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It was noted above that the embodiments of this invention can be used to provide a service to remote users. In this case then the process software that implements the data stream query fulfillment service is shared, simultaneously serving multiple customers in a flexible, automated fashion. It is standardized, requiring little customization and it is scalable, providing capacity on demand in a pay-as-you-go model. The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider. In another embodiment, the service provider requests payment directly from a customer account at a banking or financial institution. In another embodiment, if the service provider is also a customer of the customer that uses the process software application, the payment owed to the service provider is reconciled to the payment owed by the service provider to minimize the transfer of payments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent mathematical expressions can be used by those skilled in the art. However, all such and similar modifications of the teachings of this invention will still fall within the scope of this invention.

What is claimed is:

1. A method to process data, comprising:
   parsing input from a requestor, the input comprising at least one of a query or a command, expressed in a natural human language, that is parsed using action extractors and named entity extractors into a structured stream query language query comprising an indication of at least one data stream or set of data streams and at least one action to be performed on the, at least one, data stream or set of data streams;
   mapping the structured stream query language query into a graph of processing elements that are selected and interconnected so as to execute the structured stream query language query comprising at least one action and at least one named entity;
   instantiating the graph of processing elements and connecting and initializing the instantiated graph of processing elements with an identified, at least one, data stream or set of data streams to receive data from the identified at least one data stream or set of data streams; and
   outputting a result of the structured stream query language query to the requestor.

2. The method of claim 1, further comprising monitoring operation of the instantiated graph of processing elements during operation thereof.

3. The method of claim 1, where the requestor is one of a user or a software application.

4. The method of claim 1, where the processing elements are selected and interconnected so as to determine at least one of a longitudinal characteristic of an individual data stream; a longitudinal characteristic of a sub-set of data streams; a transverse characteristic of an individual data stream; an auto-correlation of an attribute of an individual data stream or set of data streams; a correlation between individual data streams or sets of data streams of different types; and longitudinal and correlation attributes of time series data across one or more data streams or sets of data streams.

5. The method of claim 1, where a result of execution of the command is to at least one of merge or combine together two or more data streams, split a data stream into two or more data streams, and interleave at least two streams.

6. The method of claim 1, where at least one data stream is a data stream comprising data being generated in real time or substantially real time.

7. The method of claim 1, where at least one data stream is a data stream comprising previously generated and stored data.

8. The method of claim 1, where at least one data stream is a data stream comprising data generated from at least one of a forecast and a model.

9. The method of claim 1, where the result comprises an identifier of at least one data stream.

10. The method of claim 1, where the step of mapping comprises mapping an action verb of the natural language query to an action to be performed on at least one data stream and mapping the at least one named entity to identify at least one data stream.

11. The method of claim 1, where a particular stream is one of data output from a sensor, a computed stream, or a re-streaming of historical data, and where an output of the instantiated graph of processing elements is a sink that comprises a storage medium and a file system.

12. A data processing system, comprising:
    at least one data processor coupled with at least one memory that stores computer software, where execution of the computer software by the at least one data processor results in the system performing operations that comprise,
    parsing input from a requestor comprised of at least one of a user and a software application, the input comprising at least one of a query or a command, expressed in a natural human language, that is parsed using action extractors and named entity extractors into a structured stream query language query comprising an indication of at least one data stream or set of data streams and at least one action to be performed on the at least one data stream or set of data streams;
    mapping the structured stream query language query into a graph of processing elements that are selected and interconnected so as to execute the structured stream query language query comprising at least one action and at least one named entity;
    instantiating the graph of processing elements and connecting and initializing the instantiated graph of processing elements with an identified at least one data stream or set of data streams to receive data from the identified at least one data stream or set of data streams; and
    outputting a result of the structured stream query language query to the requestor.

13. The data processing system of claim 12, further comprising an operation of monitoring operation of the instantiated graph of processing elements during operation thereof.

14. The data processing system of claim 12, where the processing elements are selected and interconnected so as to determine at least one of a longitudinal characteristic of an individual data stream; a longitudinal characteristic of a sub-set of data streams; a transverse characteristic of an individual data stream; an auto-correlation of an attribute of an individual data stream or set of data streams; a correlation between individual data streams or sets of data streams of different types; and longitudinal and correlation attributes of time series data across one or more data streams or sets of data streams, and where a result of execution of the command is to at least one of merge or combine together two or more data streams, split a data stream into two or more data streams, and interleave at least two streams.

15. The data processing system of claim 12, where at least one data stream is one of a data stream comprising data being generated in real time or substantially real time, a data stream comprising previously generated and stored data, and a data stream comprising data generated from at least one of a forecast and a model.

16. The data processing system of claim 12, where the result comprises an identifier of at least one data stream.

17. The data processing system of claim 12, where mapping comprises mapping an action verb of the natural language query to an action to be performed on at least one data stream and mapping the at least one named entity to identify at least one data stream.

18. The data processing system of claim 12, where a particular stream is one of data output from a sensor, a computed stream, or a re-streaming of historical data, and where an output of the instantiated graph of processing elements is a sink that comprises a storage medium and a file system.

19. A non-transitory computer-readable medium that stores computer software, where execution of the computer software by at least one data processor results in operations that comprise,
  parsing input from a requestor comprised of at least one of a user and a software application, the input comprising at least one of a query or a command, expressed in a natural human language, that is parsed using action extractors and named entity extractors into a structured stream query language query comprising an indication of at least one data stream or set of data streams and at least one action to be performed on the at least one data stream or set of data streams;
  mapping the structured stream query language query into a graph of processing elements that are selected and interconnected so as to execute the structured stream query language query comprising at least one action and at least one named entity;
  instantiating the graph of processing elements and connecting and initializing the instantiated graph of processing elements with an identified at least one data stream or set of data streams to receive data from the identified, at least one, data stream or set of data streams; and
  outputting a result of the structured stream query language query to the requestor.

20. The computer-readable medium of claim 19, further comprising an operation of monitoring operation of the instantiated graph of processing elements during operation thereof.

21. The computer-readable medium of claim 19, where the processing elements are selected and interconnected so as to determine at least one of a longitudinal characteristic of an individual data stream; a longitudinal characteristic of a subset of data streams; a transverse characteristic of an individual data stream; an auto-correlation of an attribute of an individual data stream or set of data streams; a correlation between individual data streams or sets of data streams of different types; and longitudinal and correlation attributes of time series data across one or more data streams or sets of data streams, and where a result of execution of the command is to at least one of merge or combine together two or more data streams, split a data stream into two or more data streams, and interleave at least two streams.

22. The computer-readable medium of claim 19, where at least one data stream is one of a data stream comprising data being generated in real time or substantially real time, a data stream comprising previously generated and stored data, and a data stream comprising data generated from at least one of a forecast and a model.

23. The computer-readable medium of claim 19, where the result comprises an identifier of at least one data stream.

24. The computer-readable medium of claim 19, where mapping comprises mapping an action verb of the natural language query to an action to be performed on at least one data stream and mapping the at least one named entity to identify at least one data stream.

25. The computer-readable medium of claim 19, where a particular stream is one of data output from a sensor, a computed stream, or a re-streaming of historical data, and where an output of the instantiated graph of processing elements is a sink that comprises a storage medium and a file system.

\* \* \* \* \*